(12) United States Patent
Byrne et al.

(10) Patent No.: US 7,607,954 B2
(45) Date of Patent: Oct. 27, 2009

(54) DEAD CABLE END

(76) Inventors: Joseph Byrne, 19632 Crestknoll Dr., Yorba Linda, CA (US) 92886-6404; Mark A. Forster, 22936 Dry Creek Rd., Diamond Bar, CA (US) 91765

( * ) Notice: Subject to any disclaimer, the term of this patent is extended or adjusted under 35 U.S.C. 154(b) by 0 days.

(21) Appl. No.: 12/168,737

(22) Filed: Jul. 7, 2008

(65) Prior Publication Data

US 2008/0318471 A1 Dec. 25, 2008

Related U.S. Application Data

(63) Continuation-in-part of application No. 11/712,746, filed on Feb. 27, 2007, now Pat. No. 7,407,411.

(51) Int. Cl.
*H01R 11/09* (2006.01)
(52) U.S. Cl. .................. 439/797; 174/74 R; 174/79; 439/805
(58) Field of Classification Search ............... 439/578, 439/805, 796, 797; 174/74 R, 79, 88 R
See application file for complete search history.

(56) References Cited

U.S. PATENT DOCUMENTS

| | | | | |
|---|---|---|---|---|
| 2,902,537 A | * | 9/1959 | Salvi | ............... 174/79 |
| 4,362,352 A | | 12/1982 | Hawkins et al. | |
| 4,453,034 A | * | 6/1984 | Annas et al. | ............... 174/79 |
| 4,941,834 A | | 7/1990 | DeLeo | |
| 6,015,953 A | | 1/2000 | Tosaka et al. | |
| 6,805,596 B2 | * | 10/2004 | Quesnel et al. | ............. 439/877 |
| 7,019,217 B2 | | 3/2006 | Bryant | |
| 7,247,795 B2 | | 7/2007 | Sumi et al. | |
| 7,342,175 B2 | | 3/2008 | DeFrance | |
| 7,348,489 B2 | * | 3/2008 | Chadbourne | ............. 174/74 R |
| 7,575,485 B2 | * | 8/2009 | Waltz et al. | ............. 439/783 |

FOREIGN PATENT DOCUMENTS

JP 01-265470 A 10/1989

* cited by examiner

*Primary Examiner*—Michael C Zarroli
(74) *Attorney, Agent, or Firm*—Kenneth L. Green; Edgar W. Averill, Jr.

(57) ABSTRACT

A dead cable end distributes holding force over a length of a cable end to reduce or eliminate damage to cables. The dead cable end includes a housing containing a plurality of collets each residing in a collet receptacle. Each collet includes a conical exterior and a lengthwise collet gap, and each collet receptacle includes a conical interior. The collets and collet receptacle are held inside the housing by a screw-in retaining nut, and the collet and collet receptacle pairs are compressed between the retaining nut and a spring inside the housing. The cable end resides inside the collets, and axial compressive forces on each collet and collet receptacle pair cause each collet to compress radially and hold the cable end. Anti-rotation pins are inserted through the housing into slots in the collet receptacle next to the screw-in retainer to prevent internal rotation during tightening.

17 Claims, 8 Drawing Sheets

DEAD CABLE END

The present application is a Continuation in Part of U.S. patent application Ser. No. 11/712,746 filed Feb. 27, 2007 which claims the benefit of U.S. Provisional Application Ser. No. 60/777,692, filed Feb. 27, 2006, which applications are incorporated in their entirety herein by reference.

BACKGROUND OF THE INVENTION

The present invention relates to securing the ends of cables and in particular to force distributing ends for securing the ends of cables.

Light weight cables have been developed which replace heavy steel cores with light weight cores, such as a carbon fiber core with a fiberglass sheath. Such light weight cores may be damaged by cable ends which concentrate holding forces over a small area of the cable surface. U.S. patent application Ser. No. 11/712,746 filed Feb. 27, 2007 by the present applicant describes a dead cable end assembly having a series of collets and collet receptacles which distribute the holding forces over a length of the cable to prevent damage. While the dead cable end assembly of the '746 patent provides a solution in most instances, in some instances it is difficult to tighten the dead cable end assembly without twisting the cable inside the dead cable end assembly and thereby damage the cable.

BRIEF SUMMARY OF THE INVENTION

The present invention addresses the above and other needs by providing a dead cable end which distributes holding force over a length of a cable end to reduce or eliminate damage to cables. The dead cable end includes a housing containing a plurality of collets each residing in a collet receptacle. Each collet includes a conical exterior and a lengthwise collet gap, and each collet receptacle includes a conical interior. The collets and collet receptacle are held inside the housing by a screw-in retaining nut, and the collet and collet receptacle pairs are compressed between the retaining nut and a spring inside the housing. The cable end resides inside the collets, and axial compressive forces on each collet and collet receptacle pair cause each collet to compress radially and hold the cable end. Anti-rotation pins are inserted through the housing into slots in the collet receptacle next to the screw-in retainer to prevent internal rotation during tightening.

In accordance with one aspect of the invention, there is provided a dead cable end including a housing, a retainer, and a multiplicity of collets and collet receptacles residing in series in the housing for holding a cable end. The housing includes a housing interior opening to a housing mouth and the retainer includes a retainer cable passage for allowing a cable to pass through the retainer and into the housing interior. The retainer is connectable to the housing at the housing mouth. A first collet has a conical exterior, a lengthwise collet gap, a collet cable passage for allowing the cable to pass through the collets freely when the collets are in a relaxed state, and a collet small end facing the retainer in an assembled dead cable end. A first collet receptacle has a conical cavity for cooperation with the conical exterior of the first collet. A multiplicity of additional collets and additional collet receptacles reside serially between the first collet and the first collet receptacle and the retainer with the collet small ends of the additional collets facing away from the retainer. A spring residing serially with the first collet and the first collet receptacle opposite the additional collets and collet receptacles. The collets and collet receptacles reside serially in compression in the housing between the spring and the retainer for advancing each collet into the respective collet receptacle to urge the collets to a compressed state to squeeze the cable residing in the collet cable passages to resist removing the cable from the dead cable end. The retainer is preferably a screw-in retainer and anti-rotation pins are inserted through the housing into slots in the collet receptacle next to the screw-in retainer to prevent internal rotation of the collets and collet receptacles during tightening.

In accordance with another aspect of the invention, there is provided a dead cable end including a housing, a retainer, a spring, a first collet and first collet retainer, and at least one additional collet and collet retainer. The housing has a housing interior opening to a housing mouth and the retainer is connectable to the housing mouth and includes a retainer cable passage for allowing a cable to pass through the retainer and into the housing interior. The first collet has a conical exterior, a lengthwise collet gap, and a collet cable passage to allow the cable to pass through the first collet freely when the first collet is in a relaxed state. The collet cable passage has outwardly rounded ends for preventing damage to the cable and a collet small end of the first collet faces the retainer in an assembled dead cable end. The first collet receptacle includes a conical cavity for cooperation with the conical exterior of the first collet. The additional collet and additional collet receptacle residing serially between the first collet and the first collet receptacle and the retainer with the collet small end of the additional collet facing the retainer. The spring resides serially with the first collet and the first collet receptacle opposite the retainer. The collets and collet receptacles reside serially in compression in the housing between the spring and the retainer for advancing each collet into the respective collet receptacle to urge the collets to a compressed state to squeeze the cable residing in the collet cable passages to resist removing the cable from the dead cable end. The retainer is preferably a screw-in retainer and anti-rotation pins are inserted through the housing into slots in the collet receptacle next to the screw-in retainer to prevent internal rotation of the collets and collet receptacles during tightening.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figures 1, 2, 2A, 2B:
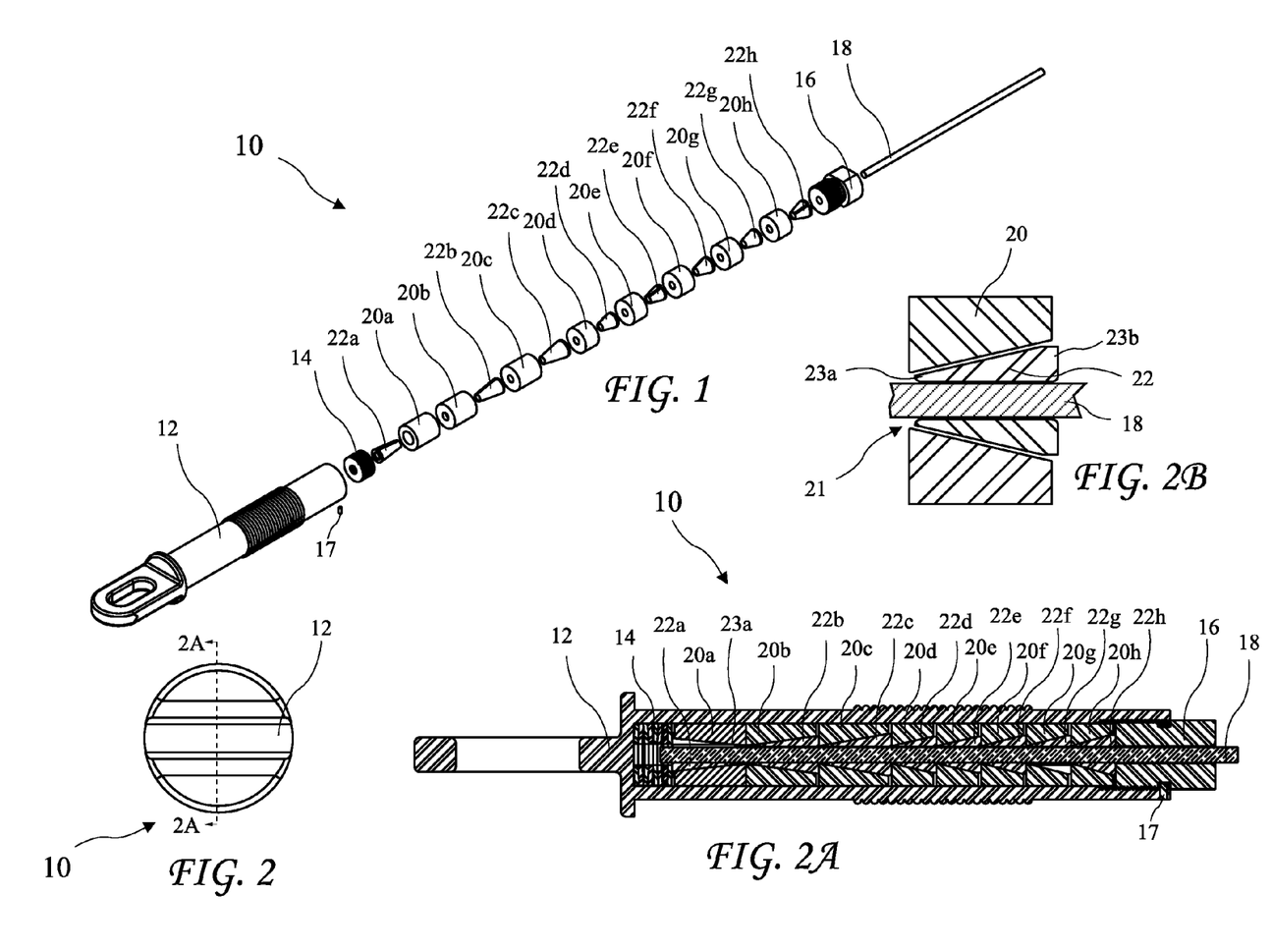
FIG. 1 is an exploded view of a dead cable end assembly according to the present invention.
FIG. 2 is an end view of the dead cable end assembly.
FIG. 2A is a cross-sectional view of the dead cable end assembly taken along line 2A-2A of FIG. 2.
FIG. 2B is a detailed view of the cooperation of a collet and collet receptacle according to the present invention.

An exploded view of a dead cable end assembly 10 according to the present invention for securing a cable 18 is shown in FIG. 1. An end view of the dead cable end assembly 10 is shown in FIG. 2, a cross-sectional view of the dead cable end assembly 10 taken along line 2A-2A of FIG. 2 is shown in FIG. 2A, and a detailed view of a general collet 22 and collet receptacle 20 is shown in FIG. 2B. The dead cable end assembly 10 secures the cable 18 through a multiplicity of collets 22a-22h cooperating with a multiplicity of collet receptacles 20a-20h. The collets 22a-22h and the collet receptacles 20a-20h are contained in a dead cable end assembly housing 12 within which the collets 22a-22h are axially compressed, using screw-in retainer 16 into the collet receptacles 20a-20h thereby radially forcing the reduction of diameter of the collets 22a-22h to exert a pressure on the cable 18. Multiple collets 22a-22h are used in order to distribute securing forces, thereby reducing the concentration of pressures exerted on the cable 18. Each collet 22a-22h is designed to hold a portion of the total tensile load applied. Once a collet 22a-22h has reached it's predetermined holding capacity, the cable 18 will slip within the collet 22a-22h at which point another collet 22a-22h will begin retaining the remaining load.

The in-series collets 22a-22h and collet receptacles 20a-20h are held in compression between the screw-in retainer 16 and a spring 14 at the opposite end of the collets 22a-22h and collet receptacles 20a-22h. The screw-in retainer 16 is preferably tightened to approximately 80 foot pounds of torque, and the collets 22a-22h and collet receptacles 20a-20h are under approximately 2700 pounds of compression. The tensile load capacity of the dead cable end assembly 10 is a function of the collet angle (or taper), collet length, and collet diameter. The collet tapers for the arrangement of collets 22 in the dead cable end assembly 10 are preferably between approximately six degrees and approximately 26 degrees and more preferably, the collet tapers for the arrangement of collets 22 in the dead cable end assembly 10 are between approximately 13 degrees and approximately 20 degrees from the collet axis. The collet lengths are preferably between approximately 0.76 inches and approximately 0.97 inches. Such preferred tapers and lengths provide the desired clamping pressure and are easily manufactured. Other dead cable ends having other arrangements of collets may utilize other tapers. For example, a dead cable end with all of the collet small ends 23a facing the screw-in retainer (see FIG. 24) may use collets with up to a 26 degree taper.

The smaller the taper, the greater the clamping pressure on the cable 18. To determine the minimum collet taper the coefficient of friction between the collet 22a-22h and cable 18 is used as well as the coefficient of friction between the collet and collet receptacle. As the coefficient of friction between the collet 22a-22h and cable 18 decreases, more collet taper is required. As the coefficient of friction between the collet 22a-22h and collet receptacle 20a-20h increases so will the collet taper. Preferably, the friction between the collet and collet receptacle is minimized by manufacturing the collets and collet receptacles from 17-4 stainless steel and using a low friction coating such as dry lubricant molybdenum disulfide or a Casidiam® coating between the collet and collet receptacle.

The collet 22a is oriented with the collet small end 23a (and thus the face of the conical exterior 31 (see FIG. 6) of the collet) facing the screw-in retainer 16, and the collets 22b-22h are oriented with the collet small end 23a facing away from the screw-in retainer 16. By orienting collets 22a and 22b with opposing collet small ends 23a facing each other, the collets 22a and 22b maintain a gripping force even if the cable load has been released. Also, by orienting collet 22a, the furthest from the screw-in retainer 16, with the collet small end 23a facing the screw-in retainer 16, increased gripping force is generated with increased cable load, thereby, increasing the compression of the preceding collets 22b-22h resulting in increased gripping forces by the collets 22b-22h.

Various angles for the collets 22 and collet receptacles 20 may be utilized to provide more even pressures on the cable 18 surface. When comparing the forces collinear to the cable load, collet 22h nearest the screw-in retainer 16 exerts a force onto screw-in retainer 16 equal to cable load. Collet receptacle 20a is furthest from screw-in retainer 16 and exerts the smallest force, only a fraction of the cable load, onto the collet receptacle 20b. Since the forces collinear to the cable load at each contacting surface increase from collet receptacle 20a to the screw-in retainer 16, the tapers of the conical surfaces 31 preferably are also increased to ensure even pressure on the cable 18 surface. An example of a set of preferred collet tapers for the collets 22a-22h of the dead cable end assembly 10 (see FIG. 2A) are approximately 6 degrees, approximately 8 degrees, approximately 10 degrees, approximately 13 degrees, approximately 13 degrees, approximately 14.5 degrees, approximately 14.5 degrees, and approximately 16 degrees respectively. The preferred collet tapers are directed to a 0.280 inch diameter carbon fiber core cable with fiber glass sheathing.

With increased collet 22 length the pressure on the cable 18 is reduced for a given collet taper and cable load, though, the total force exerted onto the cable 18 remains approximately constant. Gripping force is a function of force exerted onto the cable 18 and the coefficient of friction between the cable 18 and collet 22. Therefore, the reduction of pressure does not significantly affect the gripping force but does reduce cable failure caused by crushing.

Further, if collet tapers are the same, by stacking N number of collets in series and applying a given compression load, each collet 22 and collet receptacle 20 assembly will exert the same cable gripping force (friction between collet 22 and collet receptacle 20 is ignored in this example but may generate uneven gripping forces). For instance, if a given compression load of X pounds produces Y pounds of gripping force, the collets 22 in series will produce a gripping load of N multiplied by Y. Further, while trying to maximize collet length, length and diameter restrictions of the assembly envelope must also be considered. In the instance where one long collet is desired, the angle has to be shallow enough and/or load large enough to produce the desire clamping forces.

A gap, seen as a recess 21 of the collet small end 23a in FIG. 2B, between the adjacent collets 22 is provided to prevent touching. The gap is preferably between approximately 0.04 inches and approximately 0.10 inches with the lower tapered collets having a larger gap due to the increased movement per unit of radial deflection. For example, for a 6 degree taper collet, a gap of approximately 0.09 inches is preferred, and for a 16 degree taper collet, a gap of approximately 0.04 inches is preferred. The collet 22 has a collet small end 23a and a collet base 23b opposite the collet small end 23a.

A pin 17 resides in the housing 12 and intersects a groove 45 (see FIG. 16B) in the screw-in retainer 16. The dead cable end assembly 10 may be preassembled at the manufacturer and the pin 17 inserted to prevent tampering. The groove 45 which the pin 17 fits in is large enough to allow the screw-in retainer 16 to be loosened and relax the collets 22 to allow the cable 18 to slip through the collets 22. Once the cable 18 is in place, the screw-in retainer 16 may be tightened to 80 ft-lbs.

Figure 3:
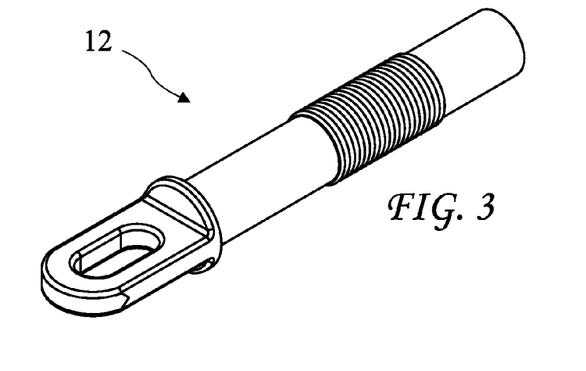
FIG. 3 is a perspective view of a dead cable end housing according to the present invention.
Figure 4A:
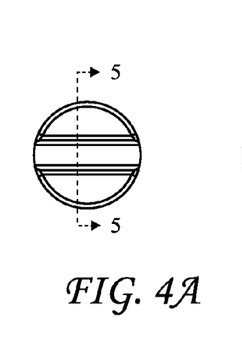
FIG. 4A is an end view of the dead cable end housing.
Figure 4B:
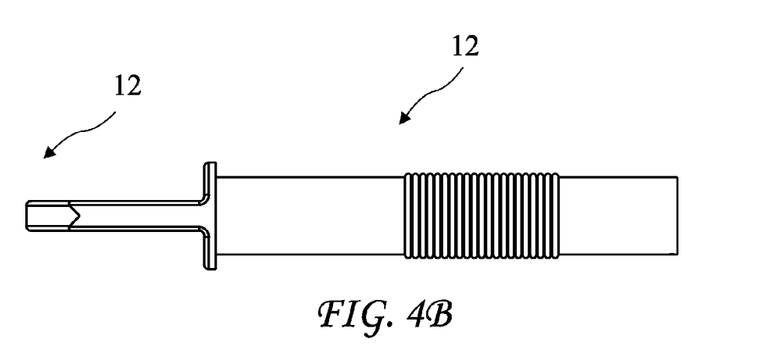
FIG. 4B is a side view of the dead cable end housing.
Figure 5:
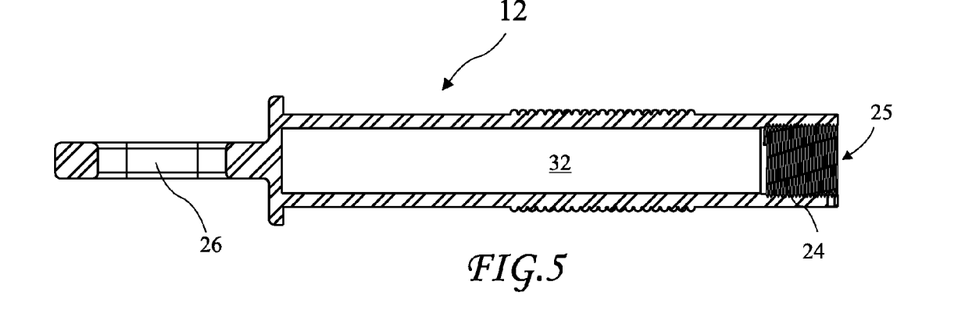
FIG. 5 is a cross-sectional view of the dead cable end housing taken along line 5-5 of FIG. 4A.

A perspective view of a dead cable end housing 12 according to the present invention is shown in FIG. 3, an end view of the dead cable end housing 12 is shown in FIG. 4A, a side view of the dead cable end housing 12 is shown in FIG. 4B, and a cross-sectional view of the dead cable end housing 12 taken along line 5-5 of FIG. 4A is shown in FIG. 5. The dead cable end housing 12 includes an attaching feature 26, a housing interior 32 and inside threads 24 for connecting the screw-in retainer 16 (see FIG. 2A). The housing interior 32 is generally cylindrical with a constant inside diameter. The housing 12 is generally cast while the remaining components are machined.

Figures 6, 7B, 9:
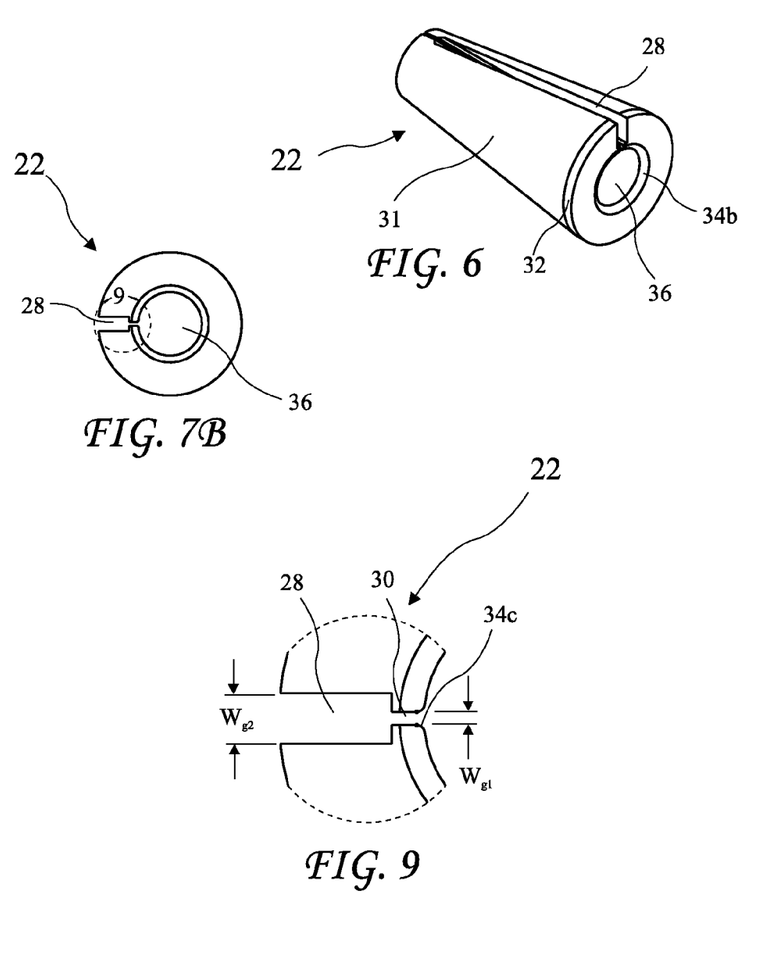
FIG. 6 is a perspective view of the collet only.
FIG. 7B is an end view of the collet.
FIG. 9 is a view of detail 9 of FIG. 7B showing a collet gap according to the present invention.
Figure 7A:
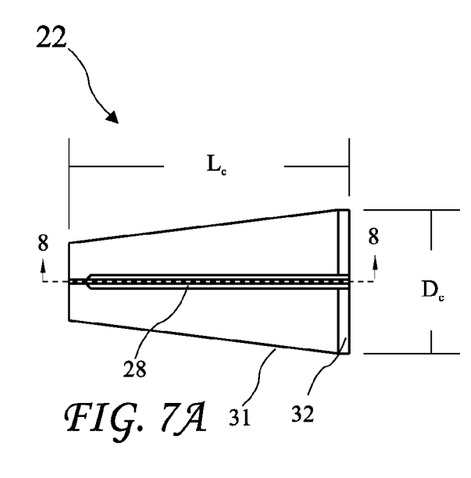
FIG. 7A is a side view of the collet according to the present invention.
Figure 8:
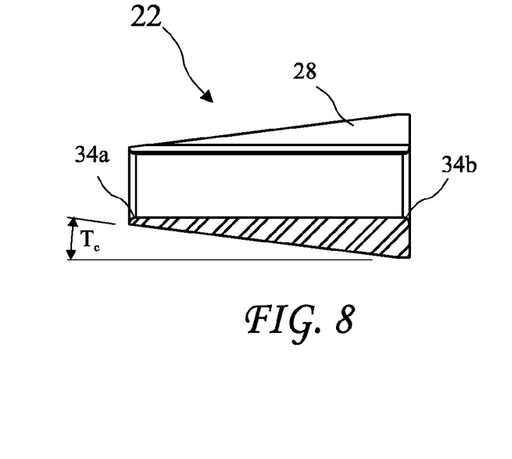
FIG. 8 is a cross-sectional view of the collet taken along line 8-8 of FIG. 7A.

A perspective view of the collet 22 only is shown in FIG. 6, a side view of the collet 22 is shown in FIG. 7A, an end view of the collet 22 is shown in FIG. 7B, a cross-sectional view of the collet 22 taken along line 8-8 of FIG. 7A is shown in FIG. 8, and a view of detail 9 of FIG. 7B showing a collet gap according to the present invention is shown in FIG. 9. The collet 22 has a tapered conical exterior 31, a collet cable passage 36 with rounded ends 34a and 34b, and a stepped lengthwise collet gap 28. The rounded ends 34a and 34b are provided to limit or prevent damage to a portion of the cable 18 residing in the collet cable passage 36 and preferably have an approximately 0.03 inch radius. The collet cable passage 36 preferably has a surface roughness between approximately 32 and approximately 63, and more preferably has a surface roughness of approximately 63.

The lengthwise collet gap 28 is preferably a stepped gap with a narrow portion 30 having a preferred width $W_{g1}$ of approximately 0.016 inches for a 0.28 inch diameter cable and the inside edge of the narrow portion 30 has a rounded edge 34c to avoid damage to the cable 18. The rounded edge 34c preferably has a radius of approximately 0.010 inches. The wider portion may, for example, have a preferred width $W_{g2}$ of approximately 0.062 inches. The preferred width $W_{g1}$ of approximately 0.016 inches has been found to be narrow enough to provide good gripping area onto the cable 18 while being wide enough to allow the needed radial deflection of the collet 22 to grip the cable 18. The width $W_{g1}$ may further be fine tuned to prevent the crushing of the cable.

The collet gaps 28 of an in-series set of collets 22 are preferably oriented within the housing 12 to prevent the collet gaps 28 of adjacent collets 22 from sharing the same orienting plane. A preferred orientation of the collet gaps 28 is at approximately 90 degree, approximately 180 degree, and approximately 270 degree increments.

In general, the collet taper $T_c$ (see FIG. 8) may be between approximately 1 degree and approximately 30 degrees. This range of tapers is based on the dead cable end assembly 10 applied to a 0.28" diameter cable. Different cable diameters may also fall within this range. Based on testing, a more preferred range of collet tapers T is between approximately four degrees and approximately 20 degrees. The length $L_c$ of the collet 22 is preferably between approximately 0.75 inches and approximately 1.25 inches. The diameter $D_c$ of the collet 22 is preferably between approximately 0.5 inches and approximately 0.9 inches. The preferred length $L_c$ and diameter $D_c$ of the collet 22 are determined by the diameter and length of the housing interior 32 (see FIG. 5) as well as the taper T of the collet 22. In general, it is preferred to maximize the collet length $L_c$ for a given housing interior diameter in order to reduce the pressures exerted onto the cable 18. For example, a collet 22 with a large taper T, for example 30 degrees, will be shorter in length then a collet 22 with a small taper, for example 5 degrees, when the allowable diameter $D_c$ is the same. When the taper T is large, the collet's resistance to deflection increases substantially and therefore the higher taper collet's diameters can be reduced in order to minimize the resistance and allow more clamping force on the cable 18.

Figure 10:
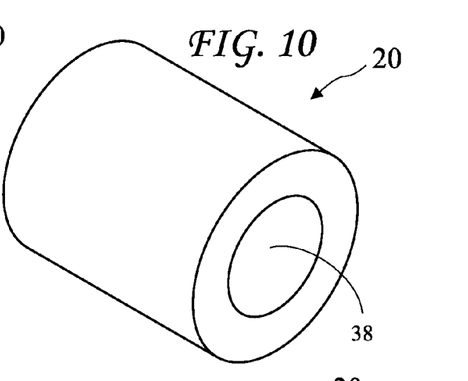
FIG. 10 is a perspective view of the collet receptacle.
Figure 11A:
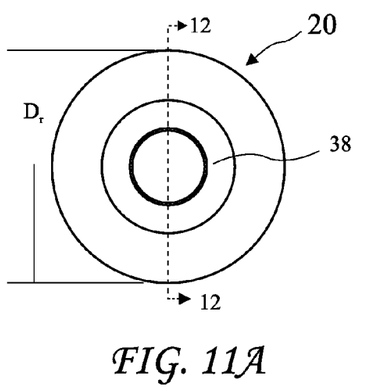
FIG. 11A is an end view of the collet receptacle according to the present invention.
Figure 11B:
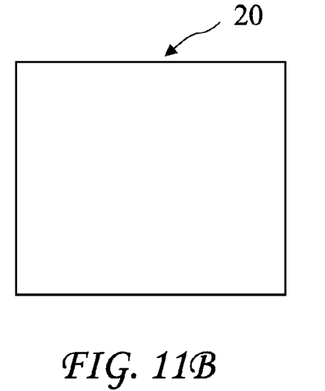
FIG. 11B is a side view of the collet receptacle
Figure 12:
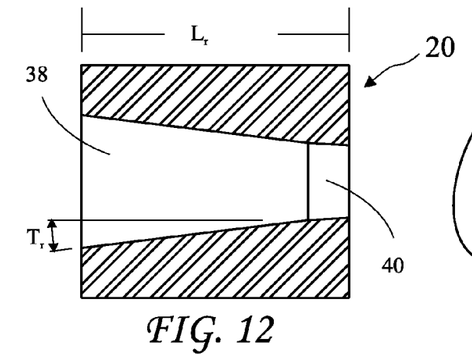
FIG. 12 is a cross-sectional view of the collet receptacle taken along line 12-12 of FIG. 11A.

A perspective view of the general collet receptacle 20 according to the present invention is shown in FIG. 10, an end view of the collet receptacle 20 is shown in FIG. 11A, a side view of the collet receptacle 20 is shown in FIG. 11B, and a cross-sectional view of the collet receptacle 20 taken along line 12-12 of FIG. 11A is shown in FIG. 12. The collet receptacle 20 has a receptacle diameter $D_r$, and a receptacle length $L_r$. The receptacle diameter $D_r$ is selected to allow the collet receptacle 20 to slide easily within the housing interior 32 (see FIG. 5). The receptacle length $L_r$ is selected to approximately match the length $L_c$ of the corresponding collet 22 so that the base 23b (see FIG. 2B) of the collet 22 always protrudes from the collet receptacle 20 under all loading. Such protrusion of the base 23b is approximately the same distance as the recess 21 of the collet small end 23a and the relative outside diameter of the conical exterior 31 (see FIG. 6) and the conical cavity 38 (see FIG. 12) must be selected accordingly. The collet receptacle 20 includes a conical cavity 38 for receiving the collet 22, with the conical cavity 38 including a relief cut 40 provided to prevent contact of the conical cavity 38 with the cable 18 to, for example, prevent possible damage to the cable 18.

Figure 13:
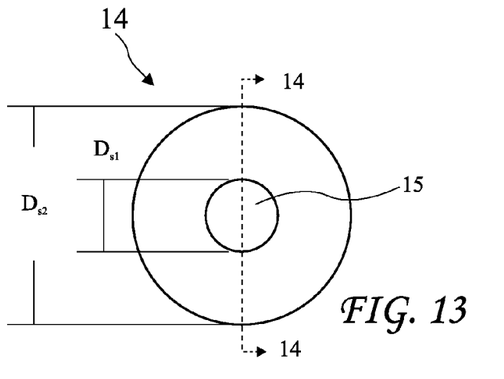
FIG. 13 is an end view of a spring according to the present invention.
Figure 14:
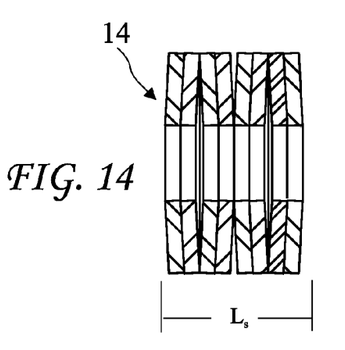
FIG. 14 is a cross-sectional view of the spring taken along line 14-14 of FIG. 13.

An end view of the spring 14 according to the present invention is shown in FIG. 13, and a cross-sectional view of the spring 14 taken along line 14-14 of FIG. 13 is shown in FIG. 14. The spring 14 has a spring inside diameter $D_{s1}$ (also a diameter of a spring cable passage 15) and a spring outside diameter $D_{s2}$. The spring outside diameter $D_{s2}$ is selected to allow the spring 14 to slide easily within the housing interior 32 (see FIG. 5) and the spring inside diameter $D_{s1}$ is selected to allow the cable 18 to slide easily inside the spring cable passage 15. A preferred spring 14 is a combination of in-series pairs of spring washers. A preferred spring 14 comprises a relaxed length (before assembly of the dead cable end assembly 10) of approximately 0.70 inches and a compressed length (after assembly of the dead cable end assembly 10) of approximately 0.624 inches corresponding to an initial load of approximately 2700 pounds without cable tension.

Figure 15:
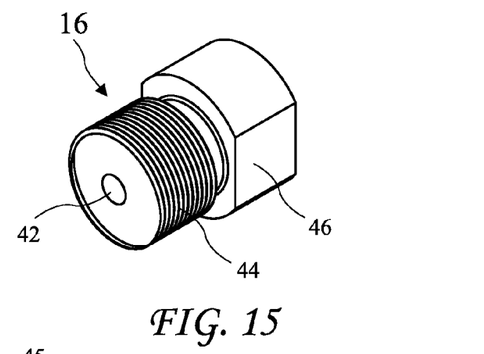
FIG. 15 is a perspective view of a screw-in retainer according to the present invention.
Figure 16A:
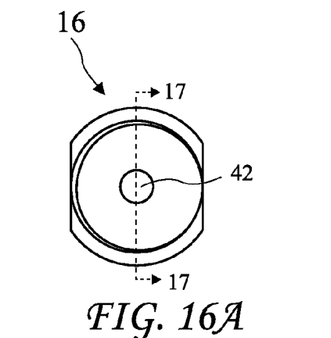
FIG. 16A is an end view of a threaded end of the screw-in retainer.
Figure 16B:
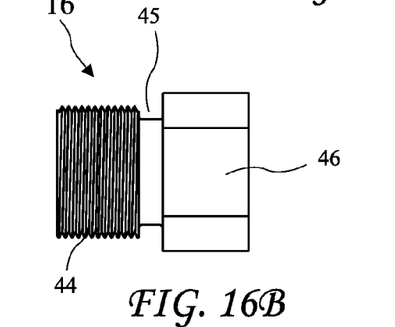
FIG. 16B is a side view of the screw-in retainer.
Figure 17:
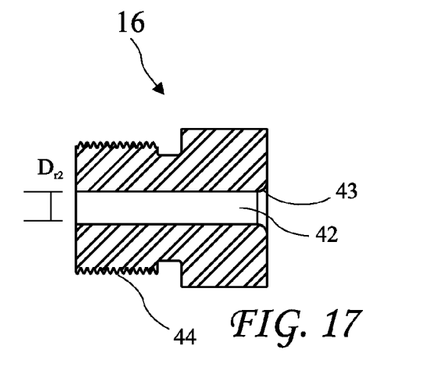
FIG. 17 is a cross-sectional view of the screw-in retainer taken along line 17-17 of FIG. 16A.

A perspective view of the screw-in retainer 16 according to the present invention is shown in FIG. 15, an end view of a threaded end of the screw-in retainer 16 is shown in FIG. 16A, a side view of the screw-in retainer 16 is shown in FIG. 16B, and a cross-sectional view of the screw-in retainer 16 taken along line 17-17 of FIG. 16A is shown in FIG. 17. The screw-in retainer 16 includes outside threads 44 to cooperate with the inside threads 24 of the housing 12 (see FIG. 5), a groove 45 for cooperation with the pin 17 (see FIG. 2A), and a retainer cable passage 42 for the cable 18. The retainer cable passage 42 has a diameter $D_{r2}$ of a size to allow the cable 18 to slide freely through the retainer passage 42, and a rounded entrance 43 to reduce or prevent damage to the cable 18. The retainer 16 includes lands 46 for a tightening tool.

Figures 18, 19:
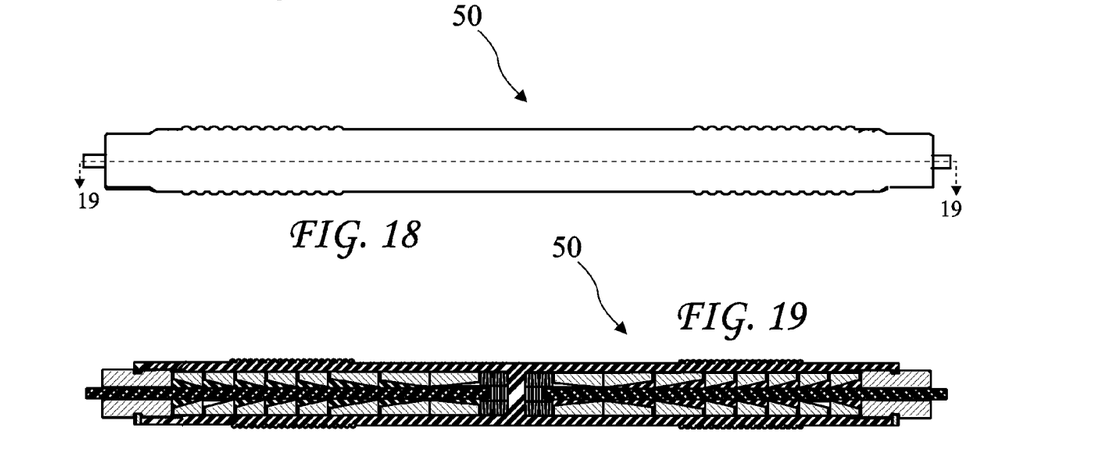
FIG. 18 is a side view of a cable end coupler according to the present invention.
FIG. 19 is a cross-sectional view of the cable coupler according to the present invention taken along line 19-19 of FIG. 18.

A side view of a cable end coupler 50 according to the present invention is shown in FIG. 18 and a cross-sectional view of the cable coupler 50 taken along line 19-19 of FIG. 18 is shown in FIG. 19. The arrangement of the spring 14, collets 22 and collet receptacles 20 in each end of the coupler 50 may be the same as the dead cable end assembly 10, or of other embodiments of the present invention.

Figure 20:
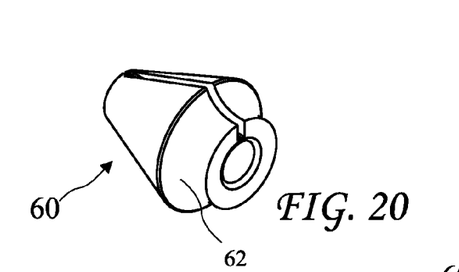
FIG. 20 is a perspective view of a second collet according to the present invention.
Figure 21A:
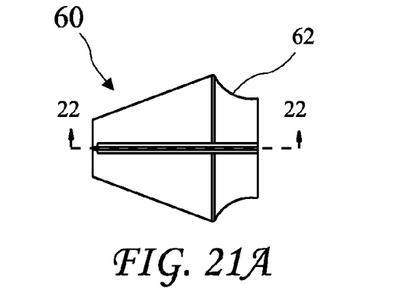
FIG. 21A is a side view of the second collet.
Figure 21B:
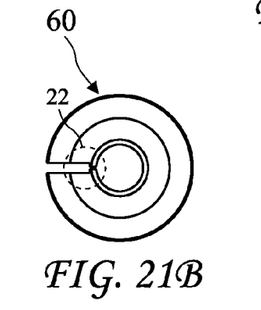
FIG. 21b is an end view of the second collet.
Figure 22:
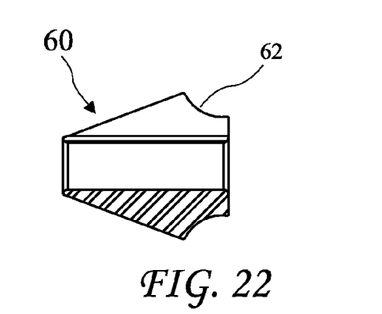
FIG. 22 is a cross-sectional view of the second collet taken along line 22-22 of FIG. 21A.

A perspective view of a second collet 60 according to the present invention is shown in FIG. 20, a side view of the second collet 60 is shown in FIG. 21A, an end view of the second collet 60 is shown in FIG. 21B, and a cross-sectional view of the second collet 60 taken along line 22-22 of FIG. 21A is shown in FIG. 22.

Figure 23:
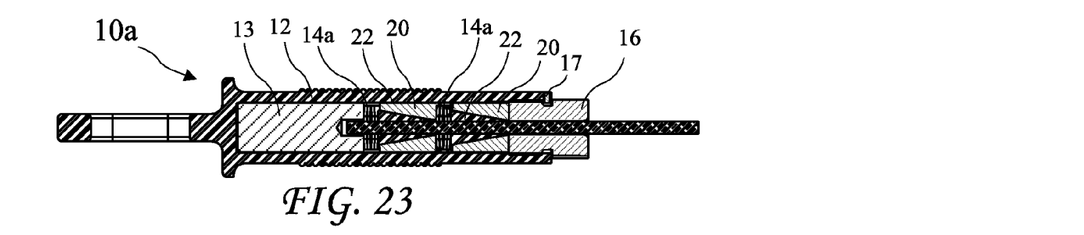
FIG. 23 is a cross-sectional view of a second dead cable end assembly according to the present invention.

A cross-sectional view of a second dead cable end assembly 10a according to the present invention is shown in FIG. 23. The second dead cable end assembly 10a includes a spring and collet assembly including two collets 22 and collet receptacles 20, both having the collet small end facing the screw-in retainer 16, and second springs 14a at the base of each collet 22. A spacer 13 resides inside the housing 12 under the spring and collet assembly.

Figure 24:
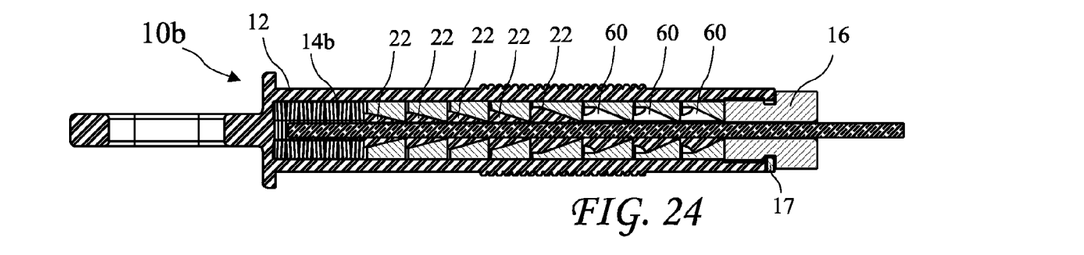
FIG. 24 is a cross-sectional view of a third dead cable end assembly according to the present invention.

A cross-sectional view of a third dead cable end assembly 10b according to the present invention is shown in FIG. 24. The third dead cable end assembly 10b includes five collets 22 and three collets 60, all of the collet small ends facing the screw-in retainer 16. The third dead cable end assembly 10b may provide advantages because holding force is increased by increased cable tension, but may require more fine tuning to obtain the advantages.

Figures 25, 26:
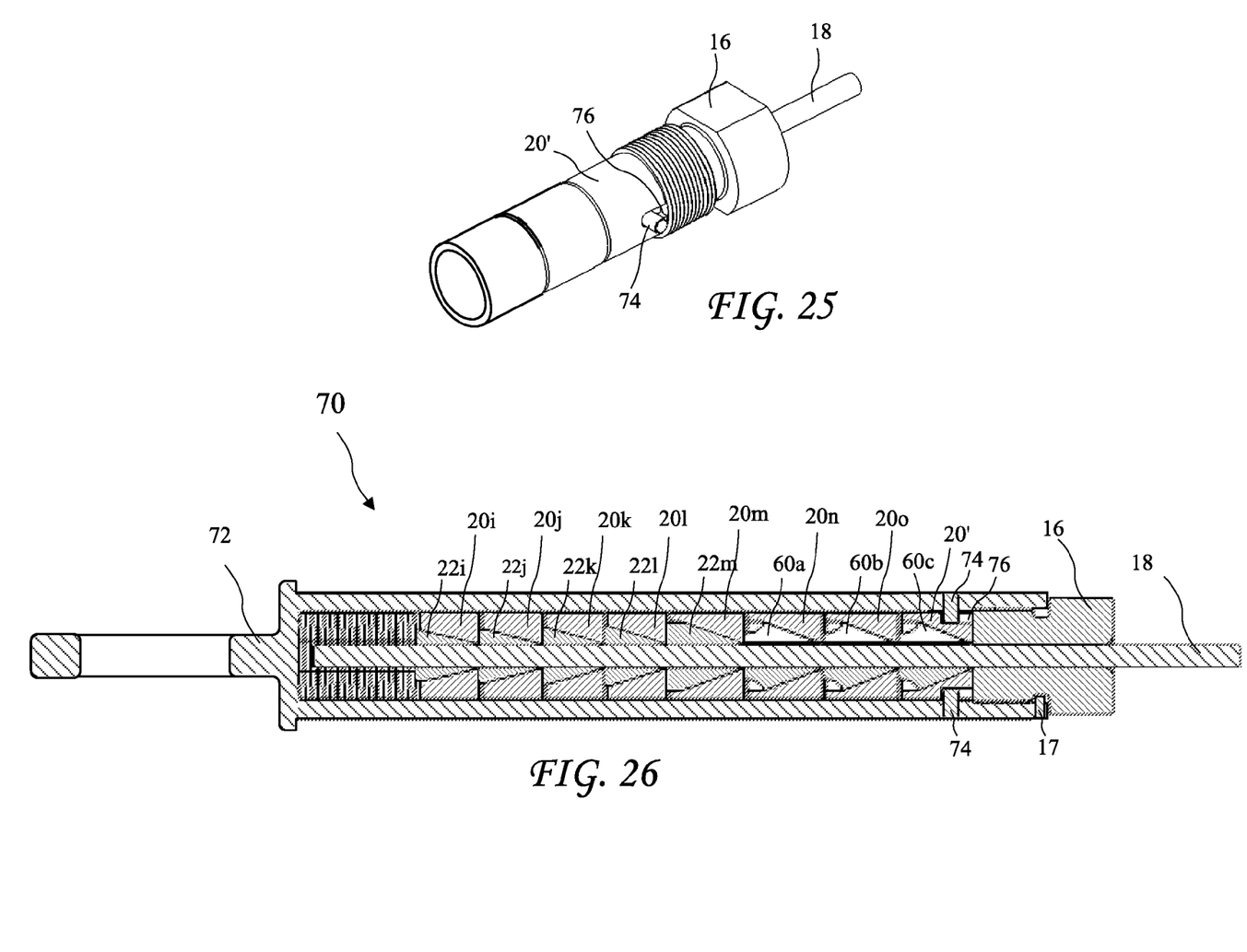
FIG. 25 is a perspective view of collet receptacles and a screw-in retainer of a fourth dead cable end assembly according to the present invention having anti-rotation pins inserted through the dead cable end assembly housing and into slots in the collet receptacle residing next to the screw-in retainer.
FIG. 26 is a cross-sectional view of the fourth embodiment of the dead cable end assembly.

A perspective view of a slotted collet receptacle 20' residing next to the screw-in retainer 16 of a fourth dead cable end assembly 70 according to the present invention is shown in FIG. 25 and a cross-sectional view of the dead cable end assembly 70 is shown in FIG. 26. Anti-rotation pins 74 are inserted through the dead cable end assembly housing 72 and into slots 76 in the collet receptacle 20' to prevent the collet receptacles from rotating when the screw-in retainer 16 is tightened into the dead cable end assembly housing 72 thereby removing a source of stress on the cable 18.

The preferred dead cable end assembly 70 comprises collets 22i-22m and 60a-60c and collets receptacles 20i-20o and 20'. Preferred tapers for the collets 22i-22m and 60a-60c and collets receptacles 20i-20o and 20' are between approximately 13 degrees and approximately 23 degrees and an example of a more preferred set of approximate tapers and approximate lengths of the collets 22i-22m and 60a-60c and collets receptacles 20i-20o and 20' are shown in Table 1.

TABLE 1

Examples of Collet and Receptacle Taper and Length

| collet | taper (deg) | length (in) | receptacle | taper (deg) | length (in) |
|---|---|---|---|---|---|
| 22i | 13 | .761 | 20i | 13 | .760 |
| 22j | 14.5 | .761 | 20j | 14.5 | .760 |
| 22k | 16 | .761 | 20k | 16 | .760 |
| 22l | 17.5 | .761 | 20l | 17.5 | .760 |
| 22m | 20 | .970 | 20m | 20 | .970 |
| 60a | 21 | .982 | 20n | 21 | .982 |
| 60b | 22 | .947 | 20o | 22 | .945 |
| 60c | 23 | .915 | 20' | 23 | .911 |

Figures 27, 30A:
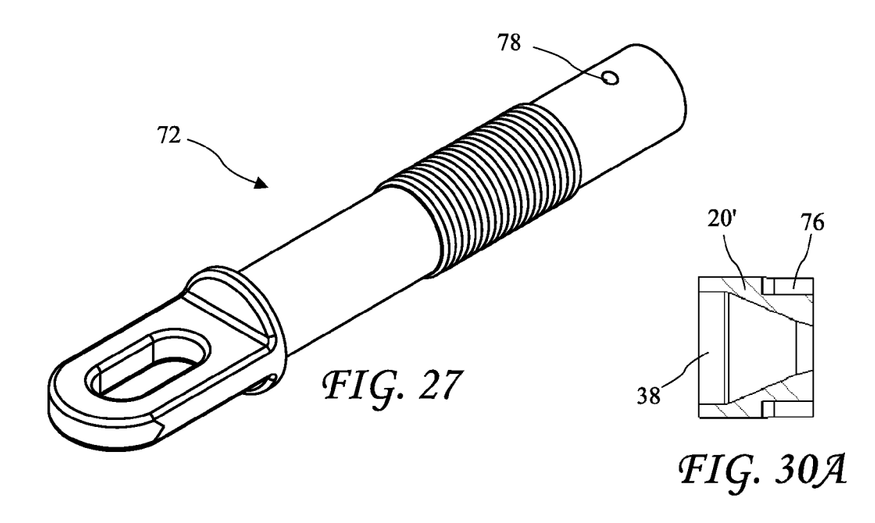
FIG. 27 is a perspective view of the dead cable end assembly housing of the fourth embodiment of the dead cable end assembly.
FIG. 30A is a cross-sectional view of the collet receptacle for residing next to the screw-in retainer of the fourth embodiment of the dead cable end assembly taken along line 30-30 of FIG. 29A.

A perspective view of the dead cable end assembly housing 72 of the dead cable end assembly 70 is shown in FIG. 27. The dead cable end assembly housing 72 includes passages 78 allowing the anti-rotation pins 74 to be inserted through the housing 72 and into the slots 76.

Figure 28:
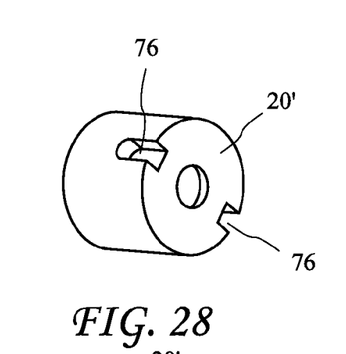
FIG. 28 is a perspective view of the collet receptacle having slots according to the present invention for the anti-rotation pins.
Figure 29A:
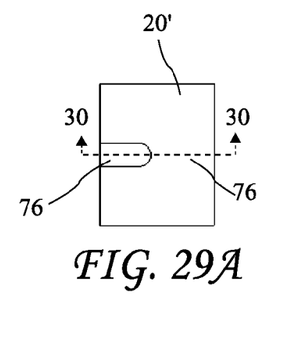
FIG. 29A is a side view of the collet receptacle for residing next to the screw-in retainer of the fourth embodiment of the dead cable end assembly.
Figure 29B:
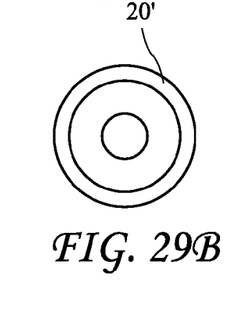
FIG. 29B is a first end view of the collet receptacle for residing next to the screw-in retainer of the fourth embodiment of the dead cable end assembly.
Figure 29C:
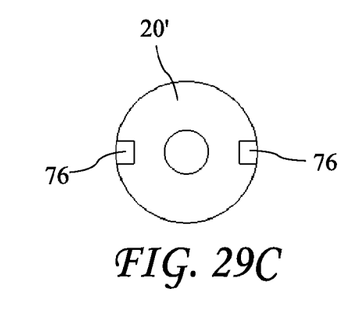
FIG. 29C is an opposite end view of the collet receptacle for residing next to the screw-in retainer of the fourth embodiment of the dead cable end assembly.

A perspective view of the collet receptacle 20' is shown in FIG. 28, a side view of the collet receptacle 20' is shown in FIG. 29A, a first end view of the collet receptacle 20' is shown in FIG. 29B, and an opposite end view of the collet receptacle 20' is shown in FIG. 29C. The collet receptacle 20' has a cylindrical exterior with the two slots 76 for receiving the pins 74 and a conical cavity 38 for receiving a conical collet.

Figure 30B:
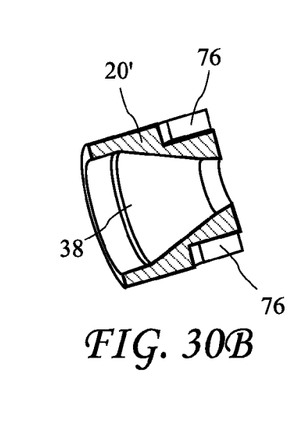
FIG. 30B is a cross-sectional perspective view of the collet receptacle for residing next to the screw-in retainer of the fourth embodiment of the dead cable end assembly taken along line 30-30 of FIG. 29A.

A cross-sectional view of the collet receptacle 20' of the fourth embodiment of the dead cable end assembly 70 taken along line 30-30 of FIG. 29A is shown in FIG. 30A, and a cross-sectional perspective view of the collet receptacle 20' taken along line 30-30 of FIG. 29A is shown in FIG. 30B. The dead cable end assembly 70 is otherwise similar to the other embodiments described above, and may be a embodied in the assemblies described in FIG. 19, 23, or 24 above.

The dead cable end assemblies described above include tapers suitable for use with collets and collet receptacles made from 17-4 stainless steel, or a material with similar mechanical characteristics. While the 17-4 stainless steel is a preferred material, dead cable end assemblies may be made from a variety of materials and dead cable end assemblies including collets and collet receptacles made from materials less resistance to deflection then the 17-4 stainless steel could utilize higher taper angles as high as 60 degrees. Other materials might use tapers as small as one degree. Thus, while preferred materials and tapers are described above, any dead cable end assemblies including a series of collets and collet receptacles to distribute loads over a length of the cable end are intended to come within the scope of the present invention regardless of taper angles.

While the invention herein disclosed has been described by means of specific embodiments and applications thereof, numerous modifications and variations could be made thereto by those skilled in the art without departing from the scope of the invention set forth in the claims.

We claim:

1. An anti-rotational dead cable end comprising:
   a housing having a housing interior, a housing mouth, and at least one anti-rotation pin passage, the at least one anti-rotation pin passage near the housing mouth;
   at least two collets, each collet having: a conical exterior; a lengthwise collet gap; and
      a collet cable passage for allowing a cable to pass through the collets freely when the collets are in a relaxed state;
   collet receptacles, each of the collet receptacles cooperating with a respective one of the at least two collets, each collet receptacle having a conical cavity for cooperation with the conical exteriors of the collets, the collets and corresponding collet receptacles sequentially residing in the housing interior; the collet receptacle nearest the housing mouth having at least one anti-rotation pin slot alignable with the anti-rotation pin passage;
   a collet retainer including a retainer cable passage for allowing the cable to pass through the collet retainer and configured to connect to the housing mouth for retaining the collet receptacles and the collets in axial compression in the housing for advancing each collet into the respective collet receptacle to urge the collets to a compressed state to squeeze the cable residing in the collet cable passages to resist removing the cable from the dead cable end; and
   an anti-rotation pin residing in the anti-rotation pin passage and engaging the anti-rotation pin slot for preventing the collet receptacles from rotating when the collet retainer is tightened.

2. The dead cable end of claim 1, further including a spring residing in the housing interior sequentially with the collets and the collet receptacles for holding the collets and the collet receptacles in compression.

3. The dead cable end of claim 2, wherein the spring comprises a plurality of in-series spring washers.

4. The dead cable end of claim 2, wherein the collet retainer is a screw retainer with outside retainer threads and the housing mouth includes internal threads for screwing the screw retainer into the housing mouth to retain the spring and collets and collet receptacles sequentially in the housing interior.

5. The dead cable end of claim 2, wherein:
   the at least one collet comprises a first collet and a second collet;
   the collet retainers comprise a first collet receptacle and a second collet receptacle;
   the first collet and the first collet receptacle reside farthest from the retainer with a collet small end facing the retainer; and
   the second collet and the second collet receptacle reside serially between the first collet and the first collet receptacle and the retainer with the collet small end of the second collet facing away from the retainer.

6. The dead cable end of claim 5, further including a third collet and a third collet receptacle residing serially between the second collet and the second collet receptacle and the retainer with the collet small end of the third collet facing away from the retainer.

7. The dead cable end of claim 6, further including a multiplicity of additional collets and collet receptacles residing serially between the second collet and the second collet receptacle and the retainer with the collet small ends of the additional collets facing away from the retainer.

8. The dead cable end of claim 7, wherein tapers of the conical exteriors of the collets increase from the conical exterior of the first collet to the conical exterior of the collet nearest to the retainer and the taper of each collet is at least as great as the taper of all of the collets farther from the retainer.

9. The dead cable end of claim 8, wherein the tapers of the conical exteriors of the collets are tapered between approximately one degree and approximately thirty degrees.

10. The dead cable end of claim 9, wherein the tapers of the conical exteriors of the collets are tapered between approximately four degrees and approximately twenty degrees.

11. The dead cable end of claim 2, wherein the collet cable passages include a rounded entrance and a rounded exit for reducing damage to the cable.

12. The dead cable end of claim 2, wherein the collet gaps are a stepped gap with a wider outward portion and a narrow inward portion.

13. The dead cable end of claim 2, wherein the narrow inward portion is approximately 0.016 inches wide.

14. The dead cable end of claim 2, wherein the conical cavities of the collet receptacles include a small open portion at the small end of the cavity to limit direct contact of the conical cavity with the cable.

15. The dead cable end of claim 2, wherein the conical exteriors of the collets and the conical cavities of the collet receptacles are sized to prevent the collet small ends from passing completely through the collet receptacles.

16. The dead cable end of claim 2, further including a pin residing proximal to the housing mouth and intersecting a groove in the retainer to hold the retainer in place following assembly of the dead cable end.

17. A dead cable end comprising:
   a housing having a housing interior, a housing mouth, and at least one anti-rotation pin passage, the at least one anti-rotation pin passage near the housing mouth;
   a retainer including a retainer cable passage for allowing a cable to pass through the retainer and into the housing interior, the retainer connectable to the housing mouth;
   a first collet nearest to the retainer and having:
      a conical exterior; a lengthwise collet gap;

a collet cable passage for allowing the cable to pass through the collets freely when the collets are in a relaxed state; and a collet small end facing the retainer in an assembled dead cable end comprising;

a first collet receptacle cooperating with the first collet, the first collet receptacle having a conical cavity for cooperation with the conical exterior of the first collet and having at least one anti-rotation pin slot alignable with the anti-rotation pin passage;

a multiplicity of additional collets and additional collet receptacles residing serially between the first collet and the first collet receptacle and the retainer with the collet small ends of the additional collets facing away from the retainer;

a spring residing serially with the first collet and the first collet receptacle opposite the additional collets and collet receptacles; and an anti-rotation pin residing in the anti-rotation pin passage and engaging the anti-rotation pin slot for preventing the collet receptacles from rotating when the collet retainer is tightened, wherein the collets and collet receptacles reside serially in compression in the housing between the spring and the retainer for advancing each collet into the respective collet receptacle to urge the collets to a compressed state to squeeze the cable residing in the collet cable passages to resist removing the cable from the dead cable end.

* * * * *